INVENTOR.
PAUL M. CUNNINGHAM

FIG 4
(a)
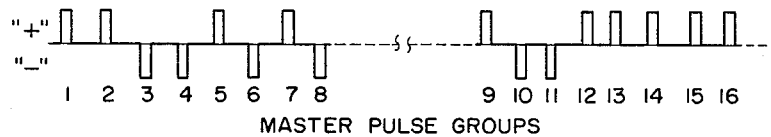
MASTER PULSE GROUPS
(b)
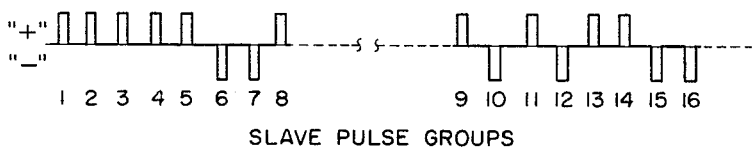
SLAVE PULSE GROUPS
(c)
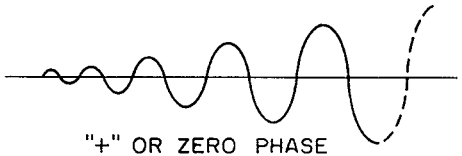
"+" OR ZERO PHASE
(d)
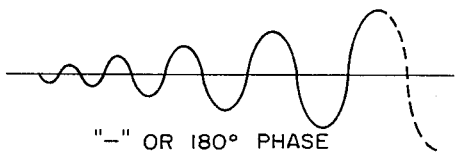
"−" OR 180° PHASE
INVENTOR.
PAUL M. CUNNINGHAM
BY Moody and Antrim
AGENTS

United States Patent Office 3,167,771
Patented Jan. 26, 1965

3,167,771
BLANKING CIRCUIT SYNCHRONIZED WITH CODE FOR BALANCING DETECTOR INTERFERENCE
Paul M. Cunningham, Richardson, Tex., assignor to Collins Radio Company, Cedar Rapids, Iowa, a corporation of Iowa
Filed Dec. 28, 1962, Ser. No. 247,906
7 Claims. (Cl. 343—103)

This invention pertains to detectors of phase coded pulse signals such as used in long range navigation systems and particularly to combinations of an inhibit circuit with a pulse forming circuit and a detector circuit.

In systems for measuring accurately the propagation time of electro-magnetic waves between remote points, coded groups of pulses of radio-frequency carrier signal are transmitted from the transmitting location to the receiving location. The carrier frequency is often 100 kilocycles. For identification purposes, the pulses that are transmitted have two different phases that differ by 180 degrees so that pulse groups can be coded for identification. In the receivers, re-created pulses that are identical to the transmitted pulses are applied to synchronous detectors to be combined with the incoming pulses. In order to provide zero output of the detector, the phase relation between the carriers of the incoming pulses and the re-created pulses is 90 degrees when the pulses are coincident. When the phase of the re-created pulses departs slightly relative to the phase of the incoming pulses, the voltage developed at the output has a polarity dependent upon the direction of departure of the phase. Since the phase of the re-created signal is changed in synchronization with the 180 degree phase changes of the incoming signal, the voltage developed at the detector is always one polarity when the phase of the re-created signal leads that of the incoming signal, and is the opposite polarity when the phase of the re-created signal lags that of the incoming signal.

An interfering continuous-wave signal that has a frequency that is almost the same as the frequency of the carrier of the incoming signal will combine with the re-created signal in the detector to cause voltage of a polarity determined by the difference in the phase of the interfering signal and the re-created signal. For simplicity, assume that the desired signals are simply coded so that alternate pulses of the re-created signal comprise carrier signals that differ 180 degrees in phase. When the non-synchronous interfering signal is combined with the re-created pulses that alternate in phase, the output of the detector is positive during one-half of the pulses, but negative during the other one-half of the pulses that have a different phase. Therefore, for an interfering signal that has either constant amplitude or slowly varying amplitude and that also has either constant frequency or slowly varying frequency, the outputs of the detectors cancel in integrating circuits to which the outputs are applied.

Because of the several requirements to be fulfilled by the several codes utilized in complex time measuring systems, all pulse groups of the coded signals cannot have equal numbers of pulses of each of the two different phases of carrier signal. The outputs of the detectors will, therefore, not always have equal numbers of negative and positive pulses that can be balanced out in the integrating circuits. Therefore, the outputs of the integrators have constant bias voltages that are derived from the interfering signal even though the re-created signals and the desired incoming signals are in exact synchronism. The outputs of the integrators are commonly applied to servo systems that provide phase correction to the re-created signals and thereby indicate timing information by their positions. The constant bias from the interfering signal causes the servo systems to operate until the desired incoming signals and the re-created signals are slightly out of synchronism to compensate for the bias developed by the interfering signals. An erroneous reading results. When the phase of the interfering signals is varying slightly relative to the phase of the re-created signals, the readings may fluctuate.

According to this invention, inhibit circuits prevent application of signals from the detectors to the integrating circuits during reception of those incoming pulses of one phase in each group that are in excess of the number of pulses of the other phase. The interfering signal is then canceled as if the code originally had equal numbers of pulses of different phases.

An object of the present invention is to provide in a timing receiver an inhibit circuit synchronized with incoming coded pulses to inhibit any predetermined pulses of coded groups of pulses.

Another object is the utilization of a single inhibit control circuit for all channels in a multi-channel timing receiver.

The objects and the following description may be more easily understood by reference to the accompanying drawings in which:

FIG. 4 is a wave diagram that illustrates the coded pulses used in timing receivers.

Figure 1:
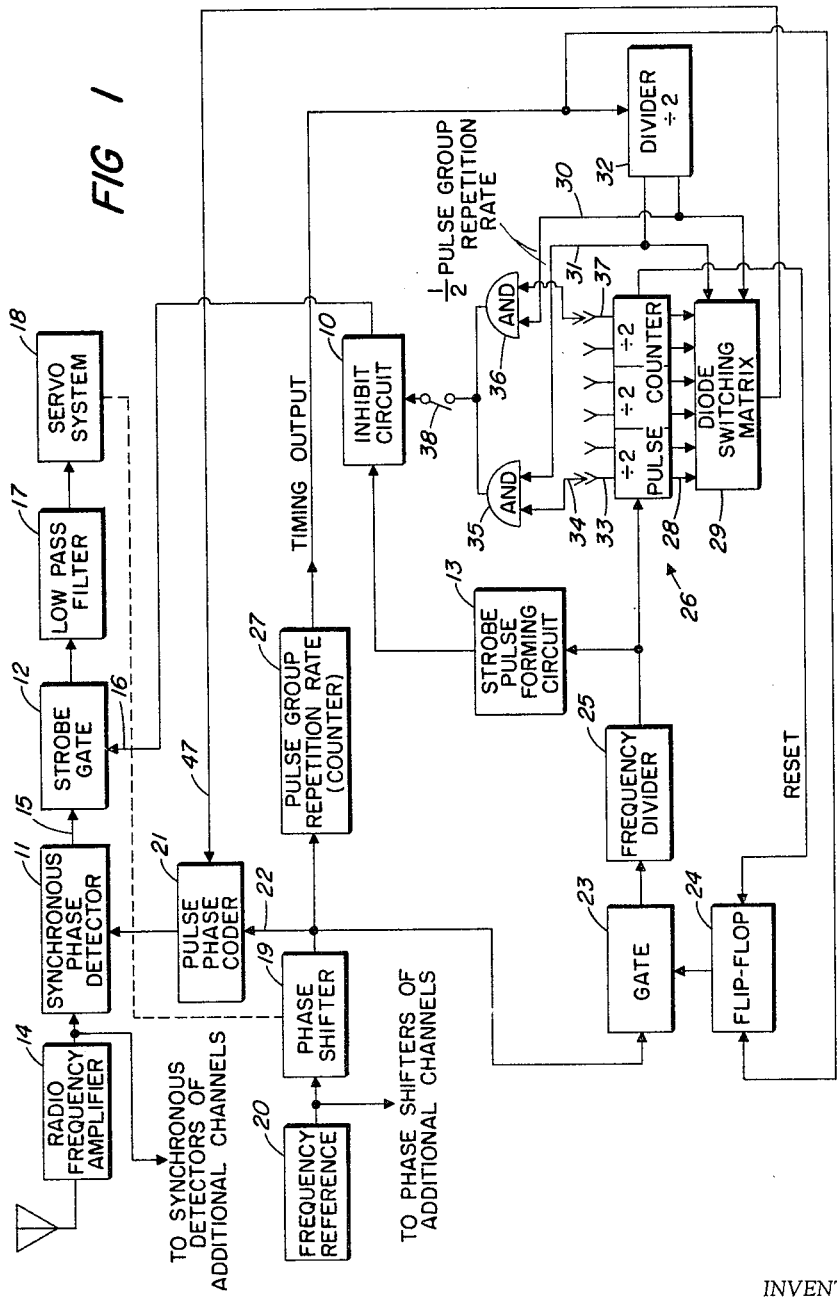
FIG. 1 is a skeleton block diagram of a single channel timing receiver that includes the inhibit circuit of this invention.

The elimination of interference by inhibiting certain pulses in pulse groups is illustrated in a loran, or long range navigation, receiver. Part of the description below relates to a type Loran-C receiver. In the Loran-C system, the location of a mobile receiving station relative to fixed transmitters is measured by the time required for signals to travel from different transmitting stations to the receiving station. Specifically, the differences in time of propagation from each one of at least two slave stations relative to a master station are measured and, by reference to a special chart, are translated into location. The signals from the various transmitting stations are identified by codes that comprise pulse groups that are very accurately spaced. Each pulse group comprises a predetermined number of pulses that are also very accurately spaced.

The pulse groups from the different transmitting stations are transmitted in succession on the same carrier frequency, and the groups are identified by distinguishing the order of two different types of pulses that have identical spacings within the groups. For example, the master pulse groups of FIG. 4a comprise two different groups of eight pulses transmitted in succession. The first group has equal numbers of "+" and "—" pulses, whereas the second group has six "+" groups and two "—" groups. The pulses at all the transmitting stations are formed by modulating a signal of a precise frequency that is typically 100 kilocycles. A "+" pulse as shown in FIG. 4c is distinguished from a "—" pulse of FIG. 4d in that the starting phase of the one is 180 degrees different from that of the other. As indicated above, the "+" and "—" pulses are combined in the receiver detectors with corresponding "+" and "—" pulses to provide error control voltage in response to slightly out-of-phase coincidence. The direction of drift from exact coincidence determines the polarity of the error voltage. Since an interfering signal near the carrier frequency does not change phase in synchronism with the re-created signals that are applied to the detectors, the polarity of the output voltages of the detectors changes with changes in types of pulses rather than with departures in phase of an interfering signal.

A balanced code to which references are made herein is one in which the number of positive pulses equals the number of negative pulses within such a short interval that positive and negative pulses developed from interference are canceled in the integrator at the output of the detecting circuits. In FIG. 4a, the master pulse group comprising pulses 1 through 8 is balanced, but the group comprising pulses 9 through 16 is unbalanced. As described below, the master pulse groups are balanced at the outputs of the detectors by inhibiting pulses 13 through 16; and with reference to FIG. 4b, the slave pulse groups are balanced by inhibiting pulses 1 through 4. When a code is unbalanced, an interfering signal having a frequency near the carrier frequency causes servo systems connected to the integrators to operate to a position that is slightly off the correct position at which the phase of the desired incoming carrier is 90 degrees from that of the re-created carrier and wrong time measurement results as described above. When the incoming interfering signal has approximately the same carrier frequency as the desired signal but the pulses are not synchronized, the outputs of the detectors may be alternating-current with very low frequency so that the servo systems make cyclical excursions from the corrected positions. A balanced code is required to eliminate an offset in position by an interfering signal at the carrier frequency except for an improbable condition where the interfering carrier has a 90 degree phase relation with the carrier of the re-created pulses that are applied to the detector.

In practice, the interference encountered in a Loran-C receiver is most likely to originate within the receiver itself. The source of continuous wave signal for forming the re-created pulses is locked in frequency with the frequency of the incoming master signal. Although extensive shielding is employed to reduce leakage from this source to the receiving input circuits, completely effective shielding is difficult to provide and to maintain during the life of the equipment. Shielding that is so extensive as to be completely reliable, complicates maintenance and repair that requires access to circuits that are shielded. Shielding is much less critical so that loran receivers may be simpler and have less weight when the inhibit circuit of this invention is applied as described below with reference to a timing receiver and to a Loran-C receiver.

Briefly, in FIG. 1 a single channel time measuring receiver is shown incorporating the inhibit circuit 10. When a balanced code is being received, the inhibit circuit is ineffective and the receiver operates conventionally to pass voltage from the synchronous detector 11 through strobe gate 12 for each desired incoming pulse signal. The strobe gate becomes momentarily conductive to pass pulses of voltage to succeeding servo control circuits 18 in response to the application of sampling or strobing pulses that are applied from strobe pulse forming circuit 13. The strobe pulses are synchronized with the incoming pulses so that the strobe gate 12 passes voltage for only a short interval during a desired part of each of the incoming pulses. When an unbalanced code is being received, the inhibit circuit 10 is effective to prevent application of strobing pulses to the strobe gate 12 during reception of particular pulses, thereby, to inhibit pulses of one phase that exceed in number those pulses of an opposite phase in each incoming pulse group. The conductivity of the inhibit circuit is controlled by pulse group forming circuits (comprised generally of pulse counter 26 and switching matrix 29) that provide different control circuits corresponding to different pulses of the groups. The control circuits 35 and 36 to be connected to the inhibit circuit 10 may be selected to inhibit any pulses within incoming pulse groups.

Figure 2:
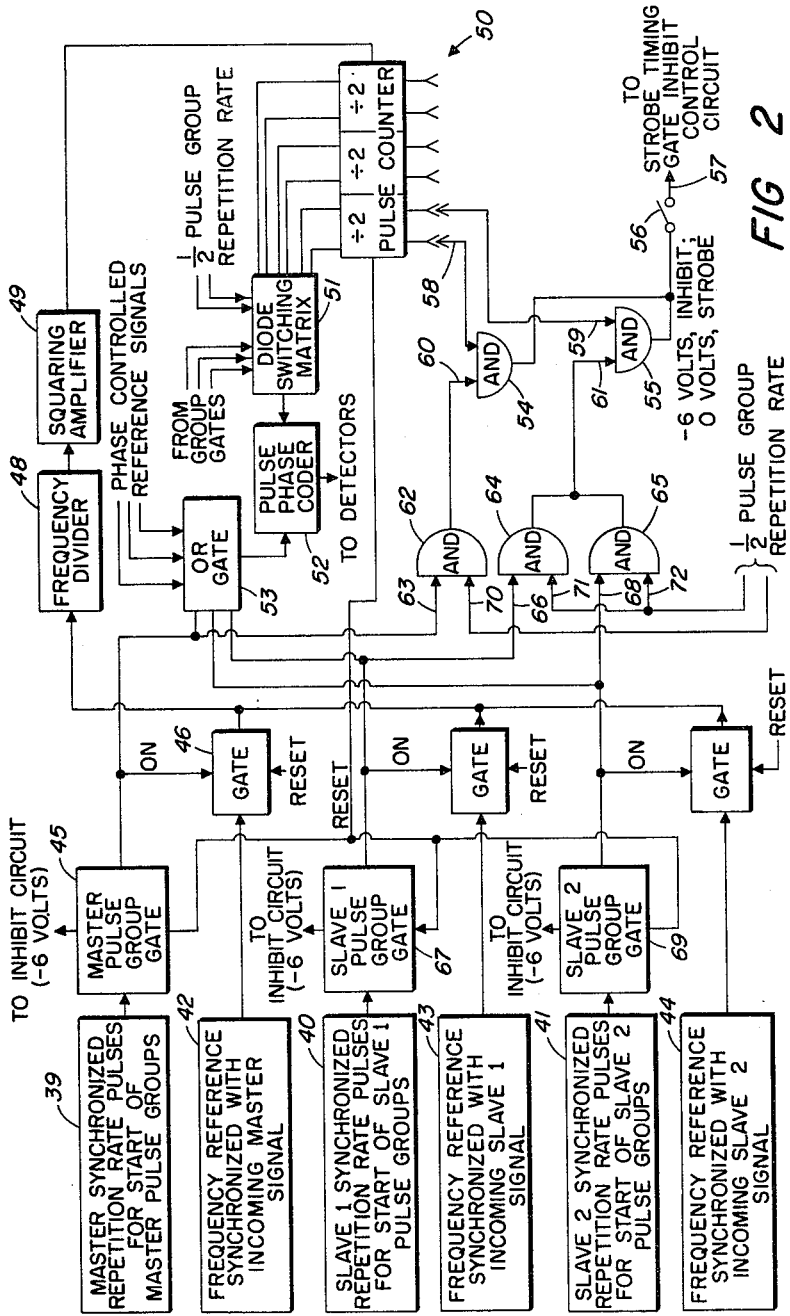
FIG. 2 is a block diagram of the pulse forming circuits and input control circuits for inhibit circuits of a three-channel loran navigation receiver.
Figure 3:
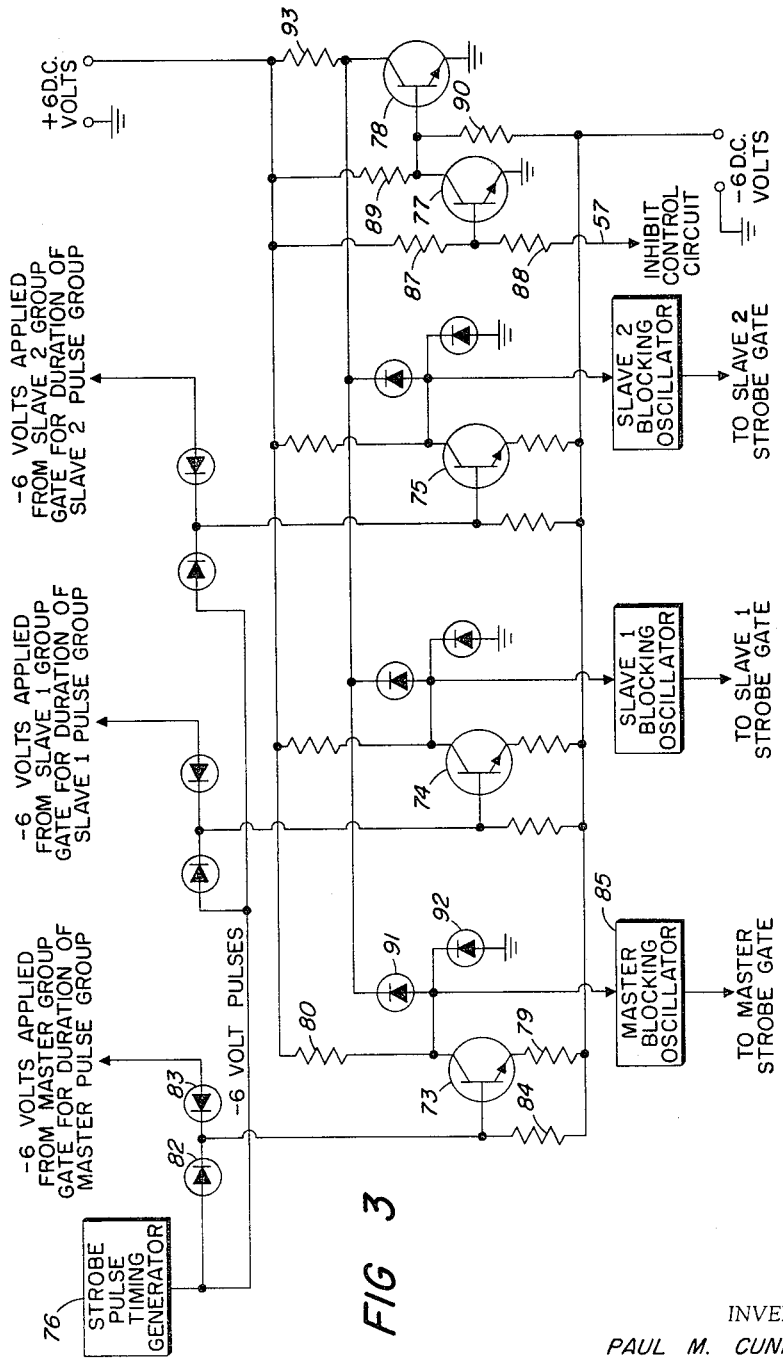
FIG. 3 is a schematic diagram of an inhibit circuit that operates in response to application of controlling pulses from the circuit of FIG. 2 to control detector strobing in a three-channel receiver as illustrated for one channel in FIG. 1.

FIGURE 2 illustrates generally a loran receiver arrangement which incorporates a common code group forming circuit (comprised generally of diode switching matrix 51, pulse counter 50 and pulse phase code 52) which is controlled sequentially for each of the Master, Slave 1 and Slave 2 channels used in the Loran-C receiver. Synchronized signals for each of the three channels for the loran system are used to control a gating circuitry that applies signals at proper times to the common code forming circuitry. Code forming circuitry controls pulse phase coding circuits 52 that applies signals to synchronous phase detectors associated with each of the Master, Slave 1 and Slave 2 channels. Each of the phase detectors is similar in operation and function to that illustrated by detector 11 in the single channel embodiment of FIG. 1. According to this invention, a pulse counting circuit 50 and certain gating circuits in conjunction with the switching matrix 51 additionally control application of voltages to the inhibit circuit of FIG. 3. The operation of this circuitry will be later described in detail. It will suffice, for the moment to state generally that the inhibit circuit of FIG. 3 is controlled in a sequential manner for the three channels by means of pulses from the pulse group gates 45, 67 and 69 and additionally by an output 57 from the inhibit control circuitry of FIG. 2, in a manner such that the application of strobing pulses (such as from master blocking oscillator 85 of FIG. 3) to the associated channel strobe gate may be selectively controlled. The inhibit circuitry of FIG. 3, therefore, sequentially and synchronously controls the application of strobing pulses to the strobe gates through which the output of associated synchronous phase detectors will be applied to the channel servo systems. Thus, the inhibit circuit of FIG. 3 is effective to selectively inhibit different pulses within the different pulse groups associated with the several channels such that all pulse groups may be balanced.

The operation of the inhibit circuit 10 may be understood in detail with reference to the skeleton block diagram of FIG. 1. Sufficient circuitry is represented by the block diagram to enable one skilled in the art to connect the inhibit circuit to the strobing circuits and to the pulse forming circuits of a single channel receiver that measures time accurately. In addition, by referring to FIGS. 2 and 3 along with published descriptions of loran systems, the connection of the inhibit circuit to loran receivers having three or more channels is apparent.

A signal such as illustrated in FIG. 4 is applied to the input of radio-frequency amplifier 14. The amplified coded pulse signal from the output of the amplifier is applied to one input of the synchronous phase detector 11. A re-created coded pulse signal that corresponds exactly to the desired incoming signal is applied to the other input of the phase detector. Normally, the phase of the carrier signal of the re-created pulses differs 90 degrees from that of the carrier of the incoming pulses so that the output of the phase detector 11 is zero when the corresponding incoming pulses and re-created pulses are coincident. When the phase and signals change from the normal 90-degree relationship, the output of the detector 11 is negative for one direction of departure in phase and positive for the opposite direction of departure. The output of the phase detector 11 is connected to input 15 of the strobe gate 12; the output of the inhibit circuit 10 is applied to input 16 of the gate 12. In simple timing receivers or in loran receivers, the strobing pulse is effective during only a small portion of each of the incoming pulses to sample the incoming pulses, thereby, to provide an exact point for timing when the pulses are free of reflections. The output of the gate 12 is connected through a low-pass filter 17 to the input of a servo system 18. The time constant of the low-pass filter is long enough to provide integration of the direct-current components of the successive pulses within the code groups. As described above, the output of a low-pass filter 17 may erroneously depart from zero when the incoming code is unbalanced and when the present inhibit circuit is not effective. In response to the departure of the input voltage from zero, the servo system 18 operates in the proper direction according to the polarity of the input voltage to operate phase shifter 19 and thus to change the phase of a re-created carrier signal applied to phase detector 11 until the incoming carrier and the re-created carrier differ in phase by 90 degrees. In addition to the coupling between the servo system 18 and the phase shifter 19 as shown in FIG. 1, the servo and phase shifter are coupled to an indicator that shows time for propagation of pulses between locations.

The output of the phase shifter 19 is connected to the input 22 of the pulse phase coder 21. The frequency of the signal applied from the reference 20 through the phase shifter 19 must be exactly equal to the carrier frequency of the incoming signal. In practice this frequency is commonly 100 kilocycles. In order to obtain desired detection in the synchronous phase detector 11, the pulse phase coder must apply to the synchronous detector a signal that corresponds in duration and phase to each pulse of the incoming signal. In order to modulate the signal that is supplied by the frequency reference 20, the pulse phase coder 21 operates as a polarity reversing switch to apply a reference signal in required phase for the duration of the pulses in response to the applications of control voltage to the control conductor 47 of the coder. The control voltage that is applied to conductor 47 must be one of two voltages corresponding to the two different phases of the pulses. The duration of application of the voltages and the spacing between the voltages must be determined in accordance with the duration of each pulse, the spacing of the pulses within a group, and the spacing between the groups of pulses. The timing of the application of voltages to conductor 47 is derived from circuits that utilize the signal from the frequency reference 20 as a timing base.

A circuit for determining the repetition rate of pulses within the groups is represented briefly by the gate 23, the flip-flop 24, the frequency divider 25, and the pulse counter 26. The signal or timing base from the phase shifter 19 is connected through the gate 23, that is controlled by the flip-flop 24, to the input of the frequency divider 25. The frequency divider 25 reduces the frequency of the timing base to a frequency corresponding to the repetition rate of the pulses. This pulse timing signal is applied to the input of the three-stage binary pulse counter 26. The three-stage pulse counter, according to the present example, counts to eight and then resets for providing pulses groups of eight pulses. The start of the pulse group is controlled by flip-flop 24 that receives a start pulse voltage or trigger from pulse group repetition rate circuits. In response to the application of the trigger, the flip-flop 24 operates to its state that closes gate 23. At the end of each count of eight, the pulse counter 26 momentarily applies a reset voltage to flip-flop 24 to open gate 23.

The starting of each pulse group is determined by pulse group repetition rate circuits represented by counter 27. In response to both the application of the timing signal that is derived from the frequency reference 20 and reset pulses synchronized with the incoming signal, the pulse group repetition rate circuits provide a pulse for the start of each re-created pulse group exactly at the time of the reception of the leading edge of the first pulse of a corresponding incoming group. Reference to complete loran circuits shows that the pulse group repetition rate counter is connected to a coding device that has positions corresponding to the position of phase shifter 19 and thereby determines the first digits for time indication while the angular position of the phase shifter 19 determines the final digits of the time indication. The output of the pulse group repetition rate circuit 27 is applied to control the circuit of flip-flop 24 and to other circuits as required to control the repetition rate of the groups.

Two conductors, corresponding to conductor 28, from each of the three stages of the pulse counter are connected to a diode switching matrix 29. A different combination of voltages is applied by the conductors to the switching matrix for each pulse in a group. The diode switching matrix provides switching in the proper order to apply to conductor 47 the control voltage required for pulse phase coder 21. As described above, in response to application of the control voltage to the coder 21, a signal in the proper phase for re-creating a pulse corresponding to the incoming pulse is applied from phase shifter 19 to the detector 11.

If the corresponding pulses in all the successive groups are similar in phase, the diode switch matrix 29 may be controlled by the pulse counter alone. When the successive groups differ in a repetitive pattern, additional voltages for application to the diode switching matrix 29 may be provided by circuits controlled by the pulse group repetition rate circuit 27. For example, when the incoming signal has two different groups that are received alternately, different voltages are applied alternately to the diode switching matrix 29 by conductors 30 and 31 that are connected to the frequency divider 32. The input of the frequency divider 32 is connected to the output of the pulse group repetition rate circuit 27 so that the frequency divider applies to conductors 30 and 31 voltages which change at the rate equal to one-half of the pulse group repetition rate. These control voltages change the switching operation of the diode switching matrix 29 so that different groups of voltage pulses are applied to the pulse phase coder 21 alternately in response to the same combination of voltages being applied to the diode switching matrix 29 from the pulse counter 26.

The same control circuits that control the time of application and the phase of pulses to the synchronous detector 11 are suitable for connection to the inhibit circuit 10 to inhibit selected pulses when desired. More particularly, the control conductor 33 for controlling the inhibit circuit corresponds to the conductor 28 for controlling the pulse phase coder 21. The conductors of the pulse counter for controlling the inhibit circuits are connected to jacks that may be selected as required for connection to the inhibit control circuits to inhibit selected pulses. For example, the jack that is connected to conductor 33 is connected to the plug of conductor 34 of the inhibit AND gate 35 and likewise, the jack that is connected to conductor 37 of the pulse counter engages a plug that is connected to one of the inputs of the AND gate 36. Each of the AND gates 35 and 36 has another input connected to the conductors 31 and 30 respectively to apply different control voltages to the inputs at one-half of the repetition rate of the pulse groups.

Each of the AND gates 35 and 36 has an output connected through an on-off inhibit switch 38 to the control input of the inhibit circuit 10. When all pulses are required for identification of the proper stations during periods when the receiver is being tuned or the servo system is being operated to bring the re-created pulses in coincidence with the incoming pulses, the switch is open. At other times when continuous-wave interference might be encountered and location is being read on the indicator of the receiver, the switch is closed so that the inhibit circuit is effective to eliminate the strobing pulses for the duration of certain incoming pulses.

The inhibit circuit 10 is responsive to the application of negative voltage to its control circuit to inhibit application of strobing pulses from strobe pulse forming circuit 13 to the strobe gate 12 at the output of the detector. The AND gates 35 and 36 apply negative voltage to the inhibit control circuit when negative voltages are applied to both inputs of one of the AND gates 35 and 36. For example, presume pulses "a" of one phase are excessive in number over the pulses of a second phase in the groups "M," that in other groups "S" that pulses "b" are excessive, and finally that groups "M" are transmitted alternately with groups "S." During the reception of the "M" group, negative voltage is applied to conductor 30 that is connected to AND gate 36 but is not applied to conductor 31 that is connected to AND gate 35. The other input of the AND gate 36 is connected to selected jacks of pulse counter 26 that are negative for the duration of the excessive pulses "a." Since both inputs of the AND gate 36 are negative for the duration of the excessive pulses in group "M," negative voltage is applied through the AND gate to the inhibit control circuit of inhibit circuit 10. The inhibit circuit is, therefore, effective to eliminate strobing during those pulses that cause the incoming group to be unbalanced. Likewise, the AND gate 35 applies negative control voltage to the inhibit circuit 10 while negative voltage is being applied to conductor 31 for the duration of the group "S" and also to conductor 34 for the duration of the excessive pulses "b." At other times when the negative voltage is removed from the control input of inhibit circuit 10, the inhibit circuit is conductive to pass strobing pulses from the strobe pulse forming circuit 13 to the strobe gate 12. The strobing pulse forming circuit 13 includes pulse forming circuits and delay circuits for developing pulses of relatively short duration compared with the incoming pulses at a time when interference due to sky wave reflection is at a minimum. The input of the strobe pulse forming circuit 13 is connected to the output of frequency divider 25 for initiating a strobing pulse for each pulse in each group.

When additional channels are added to the single channel of FIG. 1 to convert the diagram from that of a single-channel timing receiver to a diagram of a loran receiver for indicating location, additional detectors are connected to the output of radio-frequency amplifier 14, and additional phase shifters are connected to the output of the sources of frequency reference 20. Additional phase shifters and servo systems that are responsive to voltages applied from additional strobe gates that are connected to the detectors are required. A common pulse forming circuit controlled by additional switching circuits may be used in common with all channels.

An inhibit circuit suitable for use in a loran receiver that has three detection channels is shown in FIG. 3. The inhibit circuit controls the application of strobing pulses from separate detectors to succeeding servo systems. The switching circuits of FIG. 2 in cooperation with a common pulse forming circuit provide control of pulse phase coders of the channels in the sequence that signals are received for the different channels, and in addition control switching or gating circuits that are connected between the inhibit circuit and the pulse counter. The latter switching circuits control the sequence of interconnection between the pulse counter and the inhibit circuit for inhibiting different pulses within the different groups that are received by the different channels.

The three channels of the loran system for which control circuits are represented in FIG. 2 are the Master, Slave 1, and Slave 2. Each channel has a start pulse forming circuit associated with each pulse group repetition rate circuit for applying a start pulse that is synchronized with the start of reception of signal for each channel. These sources of pulses are represented in blocks 39, 40, and 41 for the respective channels. Each channel also has a synchronized frequency reference 42, 43, and 44 corresponding to the output of phase shifter 19 of FIG. 1. (The master channel serves as a main reference from which the slave references are derived.)

When the start pulse is applied from the pulse group repetition rate circuit of a particular channel, a gate for the channel becomes conductive to operate switching circuits for connecting the pulse counter so that it is effective in forming pulses for a respective group. For example, the source of master start pulses 39 is connected to the control circuit of the master pulse group gate 45. An output circuit of gate 45 is connected to the control circuit of a gate 46 that controls the application of the frequency reference signal for the master channel. The gate 46 is maintained closed until it is reset at the end of a transmission of pulse groups for the respective master channel. While the gate 46 is closed, signal from the frequency reference 42 is applied through the gate to the input of the frequency divider 48. The frequency divider 48 reduces the frequency of the reference signal until it is equal to the desired pulse repetition rate. The output of the frequency divider is applied to the input of the squaring amplifier 49 to form square waves suitable for the positive operation of the pulse counter 50. The pulse counter operates as described for FIG. 1 to provide different control voltages for each pulse and to provide reset voltage at the end of a group of eight pulses. Combinations of control voltages corresponding to each pulse are applied to the diode switching matrix 51 from the conductors that are connected to each stage of the binary pulse counter 50. The diode switching matrix 51 operates as described above for FIG. 1 to apply voltages that determine the timing and phase of pulses applied from pulse coder 52 to all of the detectors in the loran system. In addition to the application of voltages from the counter and of voltages varying at one-half the repetition rate of pulse groups as in FIG. 1, voltages from different group gates are applied to the diode switching matrix. These voltages from the group gates provide different codes for each group. The voltages that are applied at one-half the repetition rate of the pulse groups may cause alternate codes within each group. In order to apply a different reference signal in the sequence required to the detectors of each channel from the pulse phase coder 52, the OR gate 53 is provided to connect the separate reference signals to the phase coder.

The output of the group gate for each channel is connected to the OR gate 53 to control the gate for connecting the reference signal to the pulse phase coder 52 while the respective gate is on. When the master gate 45 is on, master reference signal that has its phase controlled by a master servo system is applied through the OR gate 53 to the input of the pulse phase coder 52. The applied reference signal is modulated for application to the detectors as previously described with reference to FIG. 1. Likewise, the slave 1 and slave 2 pulse group gates operate in proper sequence in response to the application of respective repetition rates to re-create coded signals for application to detectors of the respective channels.

The inhibit control circuit of FIG. 3 that is common to all channels is controlled through AND gates by the combination of: (1) voltages occurring at the pulse rate determined by the pulse counter 50, (2) other voltages occurring at one-half the repetition rate of the pulse groups, and (3) still other voltages that are derived from the channel group gates to connect these voltages that are dependent upon the pulse and group rates to the inhibit circuit at the proper time corresponding to reception of signal by each channel. Referring to FIG. 2, the outputs of the AND gates 54 and 55 are connected through the on-off inhibit switch 56 to the inhibit control conductor 57. In this example, when a voltage of —6 volts is applied from these AND gates to conductor 57, the inhibit circuit of FIG. 3 operates to prevent application of strobing voltage to the strobe gates of the different channels as described with respect to the operation of inhibit circuit 10 of FIG. 1. The on-off switch 56 is operated as required according to the previous description for switch 38.

The inputs 58 and 59 of the gates 54 and 55 respectively are connected to selected conductors of the pulse counter 50 according to the pulses that are to be inhibited within selected groups, and inputs 60 and 61 of the same gates are connected to still other gates for determining in which groups pulses are to be inhibited. The connections to the AND circuits, as shown in FIG. 2, provide inhibition of certain pulses for each of the channels as described in detail below.

The input 60 of gate 54 is connected to the output of the gate 62. The input 63 of the gate 62 is connected to the output of the master pulse group gate 45 to apply −6 volts to the input 63 during the intervals that codes are to be received by the master channel. The input 61 of the gate 55 is connected to the outputs of gates 64 and 65. The input 66 of gate 64 is connected to the output of the slave 1 pulse group gate 67 for applying a negative voltage during the reception of signal for the slave 1 channel. Likewise, the input 68 of gate 65 is connected to the output of the slave 2 pulse group gate 69. The input 70 of the gate 62 is connected to a conductor to which negative voltage is applied during alternate groups from a source that applies voltage at one-half of the repetition rate of the pulse groups. Inputs 71 and 72 of gates 64 and 65 respectively are connected to another conductor to which negative voltage is applied alternately with that applied to input 70 of gate 62.

With reference to FIG. 4a, the unbalanced master pulse groups may be converted to balanced groups by inhibiting the last four pulses, numbered 13 through 16, of alternate groups of eight pulses. The negative voltage (−6 volts) required for application to the inhibit control conductor 57 (FIG. 2) during these four pulses is applied from the output of the AND gate 54 in response to negative voltage being applied to its input conductors 58 and 60 from the pulse counter 50 and the AND gate 62 respectively. The input conductor 58 of the AND gate 54 is connected to that conductor of the pulse counter 50 that is negative during the last four counts of a pulse group. During reception of master pulse groups, the master pulse group gate 45 applies negative voltage to input 63 of the AND gate 62. During reception of the first group of pulses, corresponding to pulses numbered one through eight, zero voltage, rather than a negative voltage is applied to conductor 70 from the frequency divider circuits that apply voltage at the one-half pulse group repetition rate. Therefore, during the reception of the first group, the voltage at the outputs of the AND gates 62 and 54 is zero rather than negative and the inhibit circuit is ineffective to inhibit any of the usual strobing pulses. During reception of the next group, which is the unbalanced group, in addition to the negative voltage that is being applied to conductor 63 of the AND gate 62, negative voltage is applied to conductor 70 to cause AND gate 62 to conduct and apply negative voltage to AND gate 54 for the duration of the unbalanced master group. Since negative voltage is also applied to conductor 58 of the AND gate 54 during the reception of the last four pulses of the unbalanced group, negative voltage (−6 volts) is applied from the AND gate 54 to the inhibit control conductor 57 and inhibits the last four pulses.

With reference to FIG. 4b, the slave pulse groups become balanced when the first four pulses of the first group that is received, are inhibited. The input conductor 59 of the AND gate 55 is connected to that conductor to which −6 volts is applied from the pulse counter 50 during the first four pulses of each group. The slave 1 pulse group gate 67 applies −6 volts to the input 66 of the AND gate 64 during reception of the slave 1 pulse groups. During reception of the first group of pulses numbered one through eight, −6 volts is applied from the one-half pulse group repetition rate circuits to the input 71 of the AND gate 64. The AND gates 64 and 65 are, therefore, both conductive during the reception of the first four pulses of the slave 1 pulse groups to inhibit these pulses so that the pulse groups appear to be balanced. In a similar manner, gate 65 is conductive in response to operation of the slave 2 pulse group gate 69 so that the gate 55 is conductive for the duration of the first four pulses during reception of slave 2 groups to inhibit these pulses.

The inhibit circuit of FIG. 3 normally controls application of strobing pulses to sample the outputs of the detectors in a loran receiver of the specific type used in a Loran-C system. The circuit comprises three identical control stages that include transistors 73, 74, and 75 respectively and their controlling circuits that include transistors 77 and 78. Each of the three identical stages apply strobing pulses from a strobe pulse timing generator 76 to a respective strobe gate for the master channel, the slave 1 channel and the slave 2 channel respectively. The controlling circuits respond to the application of inhibit control voltage to clamp the collectors of the transistors 73, 74, and 75 simultaneously to zero volts (ground) as described below.

The emitter of the transistor 73 is connected through resistor 79 to a source of −6 volts and the collector of this transistor is connected through resistor 80 to a source of +6 volts. The values of the resistors 79 and 80 are equal so that during conduction of transistor 73, the voltage drop between the emitter and the collector being small, the voltage on both the emitter and the collector is substantially zero. Except for the duration of the strobing pulse, the base of transistor 73 is normally connected, or clamped, to zero volts through either diode 82 or diode 83. The base of the transistor is also connected through resistor 84 to the source of −6 volts, so that when the diodes 82 and 83 are nonconductive the base becomes negative and cuts off the current flow of transistor 73.

As long as the inhibit circuit is not effective to inhibit pulses, a pulse is applied from the collector of transistor 73 to the input of the master blocking oscillator 85 in response to the application of each strobe pulse to the base of transistor 73. In response to the application of a pulse, the master blocking oscillator forms a pulse of desired duration, typically five microseconds, for application to the master strobe gates that are connected to the detectors in the master channel. During the time other than when the master groups are being received, zero voltage from a circuit controlled by a master group gate is applied to the diode 83 to short out the negative voltage that had been applied through the resistor 84 to the base of the transistor 73. During the reception of the master groups of pulses, a voltage of −6 volts is applied through the diode 83 to the base circuit of transistor 73, but the base is still clamped to zero volts through diode 82 and strobe pulse forming circuit 76 until a strobing pulse is to be formed. When a strobing pulse is formed, a voltage of −6 volts is applied to the diode 82 and as long as diode 83 remains nonconductive, the base of the transistor 73 becomes negative to cut off the transistor. The base of the transistor quickly approaches +6 volts to apply a pulse to the master blocking oscillator 85.

The emitter of the transistor 77 is connected directly to ground. The base of the transistor 77 is connected to the junction of the series resistors 87 and 88 that are connected between the source of +6 volts and the inhibit control circuit that is connected to the conductor 57. Normally, when pulses are not to be inhibited, the inhibit control voltage on conductor 57 is zero. The base of the transistor 77 is therefore positive with respect to the emitter and the transistor is conductive. The emitter of the transistor 77 and also the base of transistor 78 are connected to the junction of the series resistors 89 and 90. The resistance value of resistor 90 is substantially greater than that of resistor 89. For example, the value of resistor 89 may be 10,000 ohms and the value of resistor 90 may be 100,000 ohms. The emitter of transistor 78 is connected to ground or zero voltage and while transistor 77 is conductive in response to the application of zero voltage to inhibit control conductor 57, the base of the transistor 78 is also substantially at zero voltage. The emitter of transistor 78 is connected through resistor 93 to the source of +6 volts. While the transistor 77 is conductive, the transistor 78 is nonconductvie and a voltage of +6 volts is applied to the diode 91 of the master control stages and to the corresponding diodes in the slave control stages. The polarity of diode 91 is such that the emitter of the transistor 73 cannot become more positive than the voltage that is applied to the diode from the resistor 93. Since the voltage applied to the diode 93 is the same as the voltage that is applied to the collector resistor 80, the diode does not limit the voltage change at the collector and, therefore, permits normal application of a pulse to the input of the master block oscillator 85 in response to the application of a pulse to the input of the transistor 73.

The value of the resistor 88 is substantially less than the value of the resistor 87 so that when an inhibit voltage of −6 volts is applied to conductor 57, the base of the transistor 77 becomes negative with respect to the emiter and the transistor is cut off. The base of the transistor 78 that is connected to the collector of the transisor 77 becomes positive and the transistor 78 becomes conductive. Since the emitter-to-collector resistance of the transistor 78 is then very low, the voltage applied to the diode 91 is substantially zero. Therefore, while the transistor 78 is conductive, the collector of the transistor 73 is clamped to ground so that it cannot make a positive excursion in response to the application of a strobe pulse control voltage to the base of the transistor 73. A diode 92 is connected between the collector of transistor 73 and ground, its polarity with respect to ground being opposite to that of the diode 91. Therefore, while inhibit voltage is applied to the input control conductor 57, the input circuit of the master blocking oscillator 85 is maintained at constant ground voltage. Although the collectors of transistors 73, 74, and 75 are clamped to ground in response to the application of inhibit control voltage, the emitters of these transistors are still permitted to follow the pulse from the strobe pulse timing generator 76. In the complete loran receiver, strobe forming circuits are connected to the emitters to permit formation of skywave guard strobing pulses that are to be effective at all times for either balanced or unbalanced incoming pulse groups.

Utilization of the inhibit circuit of this invention increases the reliability of timing receivers by reducing offset in the positioning of the servo systems upon which timing indication is dependent. Otherwise, offset may be expected when an interfering signal at the carrier frequency is encountered. Since the receiver is its own source of interference, shielding within the receiver becomes much less critical. The relatively small loss of power, usually less than three decibels, caused by eliminating pulses in the output of a detector is a small disadvantage compared with the advantage obtained in reducing interference under many conditions of operation. An inhibit circuit of this invention may be modified by those skilled in the art for application to various timing receivers, and can obviously be used in other equipments to provide a large variety of codes in which the spacings are multiples of a basic repetition rate.

What is claimed is:

1. In a receiver for receiving incoming repetitious groups of predetermined numbers of pulse signals, a detecting circuit responsive to application of said groups to its input for applying only selected pulses of each of said groups to its output, means synchronized with said incoming signal for developing control pulses for the duration of any selected ones of said incoming pulses, said detecting circuit normally being enabled to apply each of said predetermined numbers of pulses to its output, and disabling means responsive to the application of said selected control pulses for disabling said detecting circuit for the duration of said incoming pulses corresponding to said selected control pulses.

2. In a radio receiver for receiving incoming repetitious groups of predetermined numbers of pulse signals, a source of reference signal, a synchronous detecting circuit including disabling means, said synchronous detecting circuit having a first input for receiving said incoming pulse signals and a second input connected to said source of reference signal, servo means for shifting the phase of signal applied from said source to said second input of said detecting system, said servo means having an input control circuit, the output of said detector being coupled through said disabling means to said servo input control circuit for applying control voltage thereto, means for developing an inhibit control pulse for the duration of each pulse of said incoming signal, means for selecting inhibit control pulses corresponding to predetermined pulses in each of said incoming repetitious groups and applying said selected inhibit control pulses to said inhibit circuit, said inhibit circuit being connected to said disabling means, and said disabling means responsive to application of said selected inhibit control pulses to disable said synchronous detecting circuit to prevent application of control voltage from said synchronous detecting circuit to said servo input control circuit for the duration of said incoming pulses that correspond to said selected inhibit control pulses.

3. In a radio receiver for receiving incoming repetitious groups of predetermined numbers of pulse signals, a source of reference signal, a synchronous detector having a first input for receiving said incoming pulse signals and a second input connected to said source of reference signal, servo means for shifting the phase of signal applied from said source to said second input of said detector, a sampling gate, said servo means having an input control circuit, the output of said detector being coupled through said sampling gate to said servo input control circuit for applying control voltage thereto, said sampling gate normally being conductive to pass each pulse of a desired incoming signal; an inhibit circuit, means for developing an inhibit control pulse for the duration of each pulse of said incoming signal, means for selecting inhibit control pulses corresponding to predetermined pulses in each of said incoming repetitious groups and applying said selected inhibit control pulses to said inhibit circuit, said inhibit circuit being connected to said sampling gate, and said sampling gate becoming nonconductive in response to application of said selected inhibit control pulses to prevent application of control voltage from said detector to said servo input control circuit for the duration of said incoming pulses that correspond to said selected inhibit control pulses.

4. In a radio receiver for receiving incoming repetitious pulse groups that have predetermined numbers of pulses, a detector, a sampling gate connected to said detector, an inhibit circuit connected to said sampling gate, a source of strobe pulses connected to said inhibit circuit, means for synchronizing said source of strobe pulses with said incoming pulses for developing a strobe pulse within the interval of each of said incoming pulses, said inhibit circuit normally being conductive for passing said strobe pulses to said sampling gate, said sampling gate being responsive to the application of said strobe pulses to pass to its output circuit voltage from simultaneous incoming pulses, an inhibit control circuit corresponding to each of said pulses in said groups, means synchronized with said incoming signal for developing inhibit voltage on each of said inhibit control circuits for the duration of a corresponding pulse, means for connecting selected ones of said inhibit control circuits to said inhibit circuit, and said inhibit circuit becoming non-conductive in response to application of said inhibit voltage to prevent the application of voltage to the output circuit of said sampling gate for the duration of each group of the incoming pulses corresponding to the selected inhibit control circuits.

5. A radio time delay measuring system comprising: a detector for demodulating incoming coded pulse signals, the coded pulse signals being successive groups of predetermined numbers of pulses, a source of timing signal having servo phase controlling means, said servo means responsive to the departure of control voltage from a normal value to change the phase of the output of said source of timing signal, a strobing gate having a strobing control circuit, an input connected to the output of said detector, and an output connected to said servo means to supply control voltage thereto, a coder including a pulse counter, said coder being responsive to application of phase controlled signal from said source of timing signal to form pulses of signal in synchronism with pulses of said incoming signals, a strobe pulse forming circuit, means for synchronizing the operation of said strobe pulse forming circuit with said timing means to provide a strobing pulse within the interval of each pulse of said incoming coded signal, an inhibit circuit having an input, an output, and an inhibit control circuit, said input of said inhibit control circuit being connected to said strobe pulse forming circuit, said output of said inhibit control circuit being connected to said strobing control circuit, means for connecting said inhibit control circuit to selected ones of said outputs of said pulse counter to apply inhibit voltage to said inhibit control circuit for the duration of the pulses corresponding to said selected output circuits, said inhibit circuit normally being conductive to pass strobing pulses from said pulse forming circuit to the strobing control circuits of said strobing gates, said strobing gates being conductive during the application of said strobing pulses thereto to sample incoming pulses corresponding to said strobing pulses for applying control voltage to said respective servo means, and said inhibit circuit being nonconductive in response to application of said inhibit control voltage to prevent application of control voltage to said servo means.

6. A radio time delay measuring system comprising: a synchronous detector having a first input for receiving incoming coded pulse signals and a second input for receiving a reference signal, the coded pulse signals being successive groups of predetermined numbers of pulses, a source of timing signal having servo phase control means, said second input of said synchronous detector being connected to said source of timing signal, said servo means responsive to the departure of control voltage from a normal value to change the phase of the output of said source of timing signal, a strobing gate having a strobing control circuit, an input connected to the output of said detector, and an output connected to said servo means to supply control voltage thereto, a coder including a pulse counter, said coder being responsive to application of phase controlled signal from said source of timing signal to form pulses of signal in synchronism with pulses of said incoming signals, a strobe pulse forming circuit, means for synchronizing the operation of said strobe pulse forming circuit with said timing means to provide a strobing pulse within the interval of each pulse of said incoming coded signal, an inhibit circuit having an input, an output, and an inhibit control circuit, said input of said inhibit control circuit being connected to said strobe pulse forming circuit, said output of said inhibit control circuit being connected to said strobing control circuit, means for connecting said inhibit control circuit to selected ones of said outputs of said pulse counter to apply inhibit voltage to said inhibit control circuit for the duration of the pulses corresponding to said selected output circuits, said inhibit circuit normally being conductive to pass strobing pulses from said pulse forming circuit to the strobing control circuits of said strobing gates, said strobing gates being conductive during the application of said strobing pulses thereto to sample incoming pulses corresponding to said strobing pulses for applying control voltage to said respective servo means, and said inhibit circuit being nonconductive in response to application of said inhibit control voltage to prevent application of control voltage to said servo means.

7. In a loran receiving system having a plurality of detectors for demodulating incoming coded pulse signals, the coded pulse signals being successive groups of predetermined numbers of pulses, a source of timing signal with servo phase controlling means for each of said detectors, each of said servo means responsive to the departure of control voltage from a normal value to change the phase of the output of the respective source of timing signal, a strobing gate for each of said detectors, each of said strobing gates having a strobing control circuit, an input coupled to the output of a respective one of said detectors, and an output connected to a respective one of said servo means to supply control voltage thereto, said detectors normally being disabled, means for enabling said detectors one at a time for receiving predetermined groups of said incoming coded signals, a coder including a pulse counter, said coder being responsive to application of phase controlled signal from said sources of timing signal to form pulses of signal in synchronism with pulses of said incoming coded signals at the outputs of said plurality of detectors, a strobe pulse forming circuit, means for synchronizing the operation of said strobe pulse forming circuit with said timing means to provide a strobing pulse within the interval of each pulse of said incoming coded signal; an inhibit circuit having an input, an output, and an inhibit control circuit, said input of said inhibit control circuit being connected to said strobe pulse forming circuit, said output of said inhibit control circuit being connected to said strobing control circuit, said pulse counter having a separate output corresponding to each pulse in each group of pulses of said coded pulse signals, means for connecting said inhibit control circuit to selected ones of said outputs of said pulse counter to apply inhibit voltage to said inhibit control circuit for the duration of the pulses corresponding to said selected output circuits, said inhibit circuit normally being conductive to pass strobing pulses from said pulse forming circuit to the strobing control circuit of each of said strobing gates, said strobing gates being conductive during the application of said strobing pulses thereto to sample incoming pulses corresponding to said strobing pulses for applying control voltage to said respective servo means, and said inhibit circuit being nonconductive in response to application of said inhibit control voltage to prevent application of control voltage to said servo means.

References Cited in the file of this patent

UNITED STATES PATENTS 3,099,835    Frank et al.             July 30, 1963